United States Patent [19]

Föhl

[11] Patent Number: 4,485,985
[45] Date of Patent: Dec. 4, 1984

[54] BELT STRAP-CLAMPING DEVICE FOR SAFETY BELTS IN MOTOR VEHICLES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 579,149

[22] Filed: Feb. 10, 1984

Related U.S. Application Data

[63] Continuation of Ser. No. 389,903, Jun. 18, 1982, abandoned.

[30] Foreign Application Priority Data

Jun. 19, 1981 [DE] Fed. Rep. of Germany ....... 3124188

[51] Int. Cl.³ ...................... A62B 35/02; B65H 75/48
[52] U.S. Cl. .................................. 242/107.2; 280/806
[58] Field of Search ....... 242/107.2, 107.4 R–107.4 E; 280/806–808; 297/476–479, 480, 482

[56] References Cited

U.S. PATENT DOCUMENTS

| | | | |
|---|---|---|---|
| 1,569,699 | 1/1926 | Bergstrom et al. | 242/107.2 |
| 4,327,881 | 5/1982 | Fohl | 242/107.2 |
| 4,378,915 | 4/1983 | Fohl | 242/107.2 |
| 4,387,790 | 6/1983 | Yasumatsu et al. | 242/107.2 X |

Primary Examiner—John M. Jillions
Attorney, Agent, or Firm—Yount & Tarolli

[57] ABSTRACT

Belt strap-clamping device for safety belts in motor vehicles which has a roll-up device with a belt strap which is rolled-up on a belt drum, and which can be rolled out against a spring-force. The belt from the roll-up device is partially wrapped around a deflection member with an arched deflection surface, hinged around an axis, and arranged after the belt drum. The belt strap works in conjunction with a clamping surface which is fixed in the fitting, such that the deflection member is moved when an increased force is applied, and the belt strap is clamped between the clamping surface and the deflection member. At a normal pulling out of the belt the deflection member is held at a distance from the clamping surface by the force of a spring. The deflection surface is formed by a sleeve-like deflection member, which is during normal operation freely rotatable on an eccentrically supported roller, which can be displaced on a predetermined angular path in relation to a clamping surface. The surface of the deflection member is made so that at an increasing radial force the amount of friction between the belt and this surface also increases. Thereby the deflection member is radially displaced with respect to the roller, which has moved into the blocked position, and makes a positive, frictionally coupled connection with the roller.

12 Claims, 17 Drawing Figures

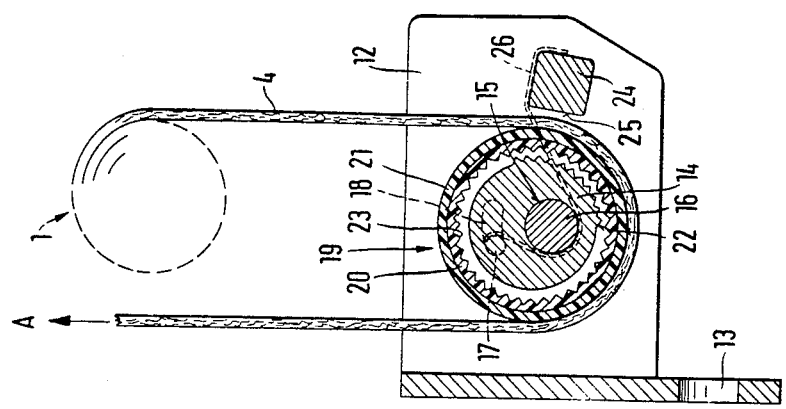
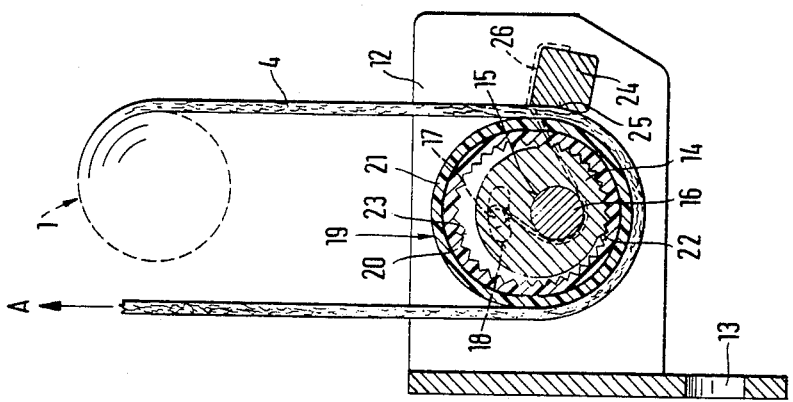
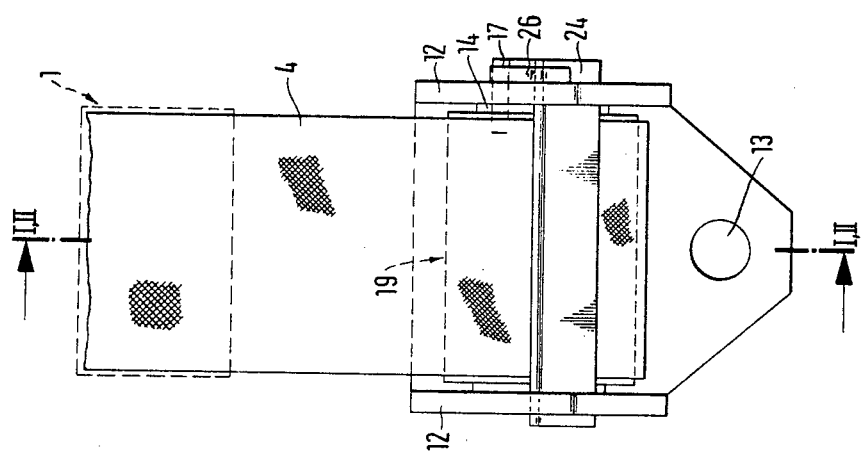

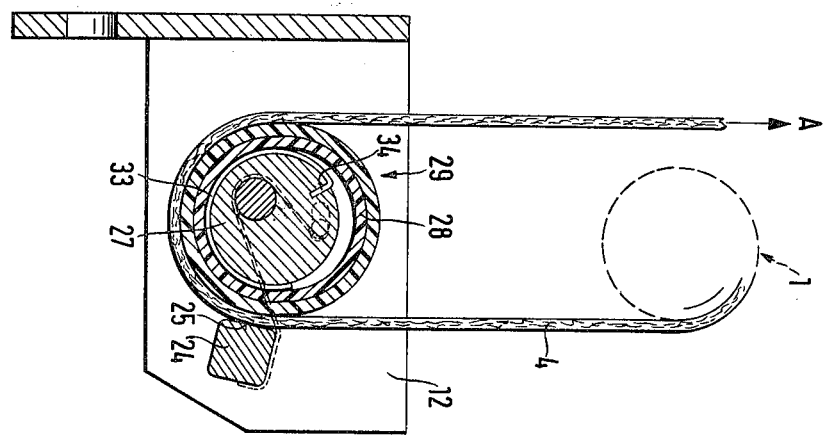
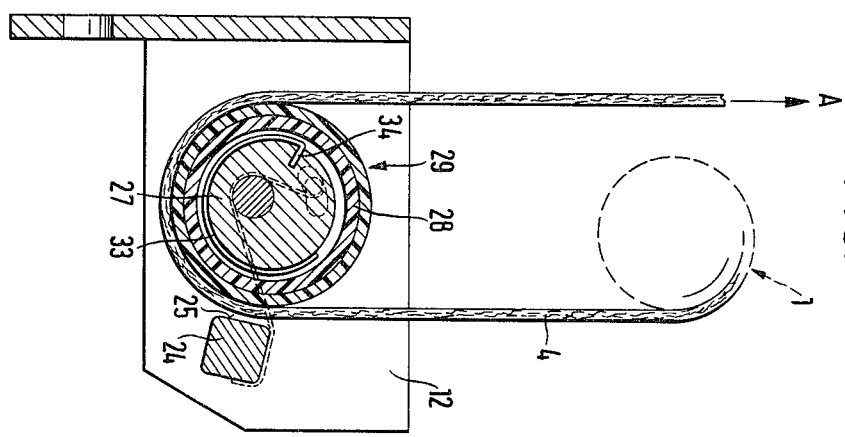

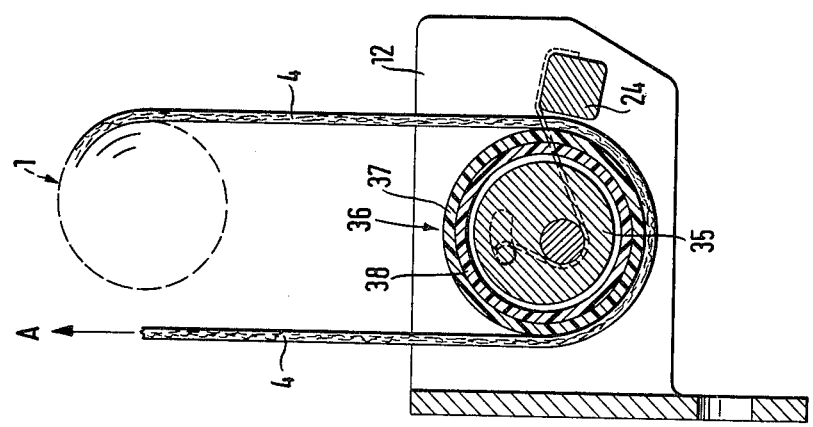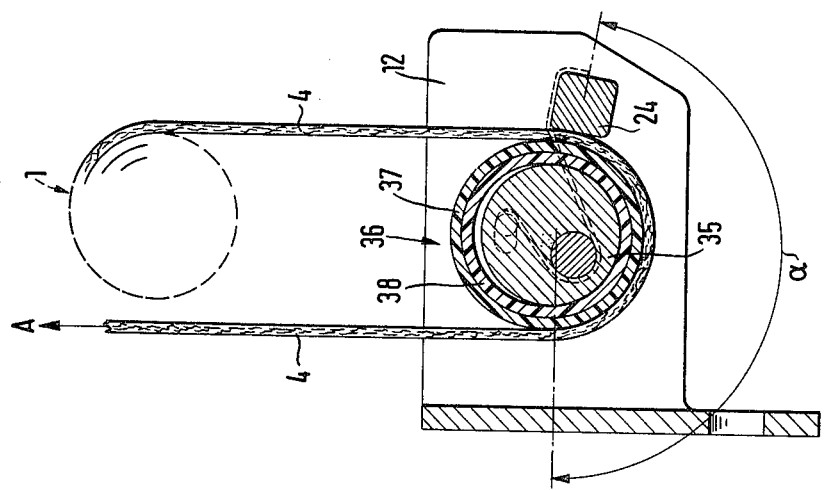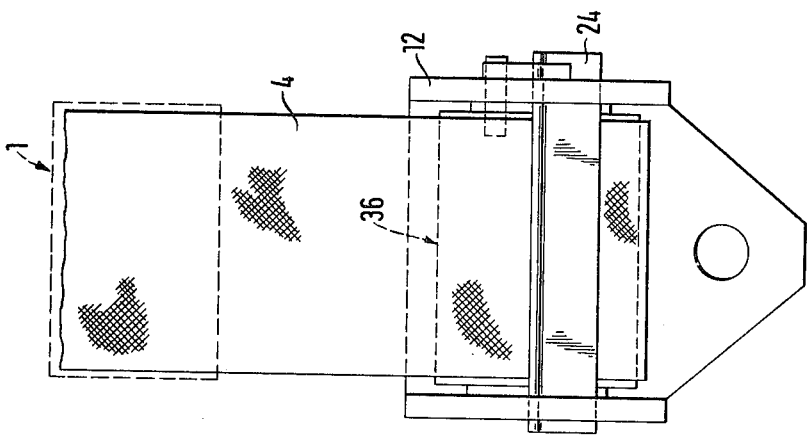

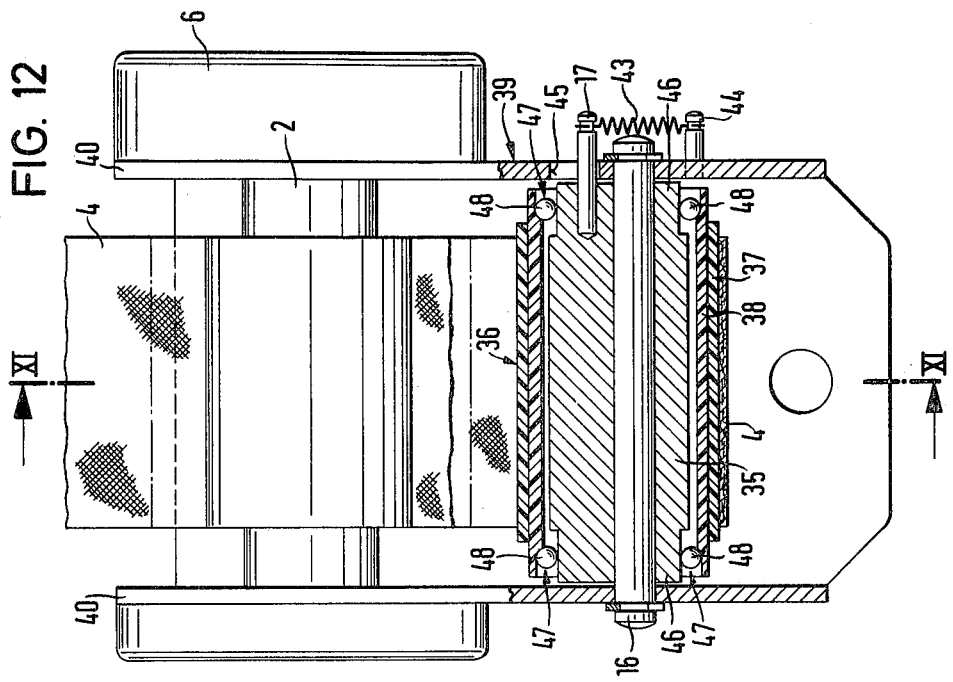
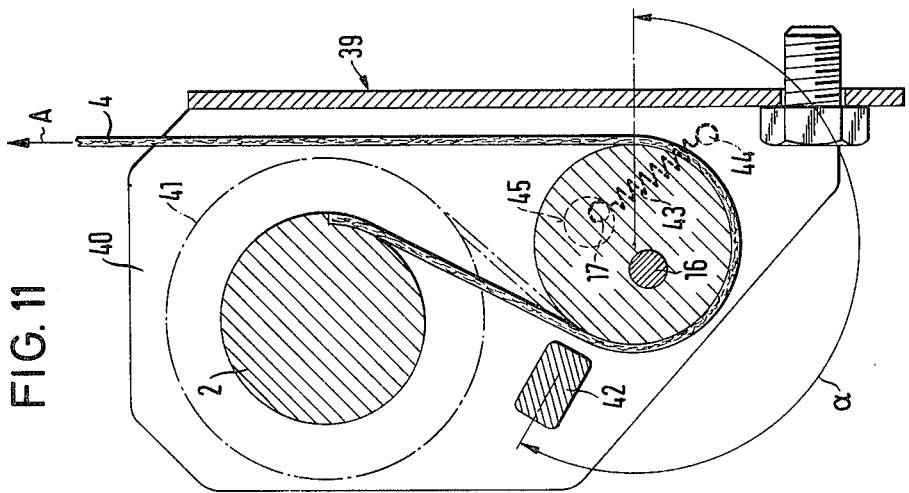

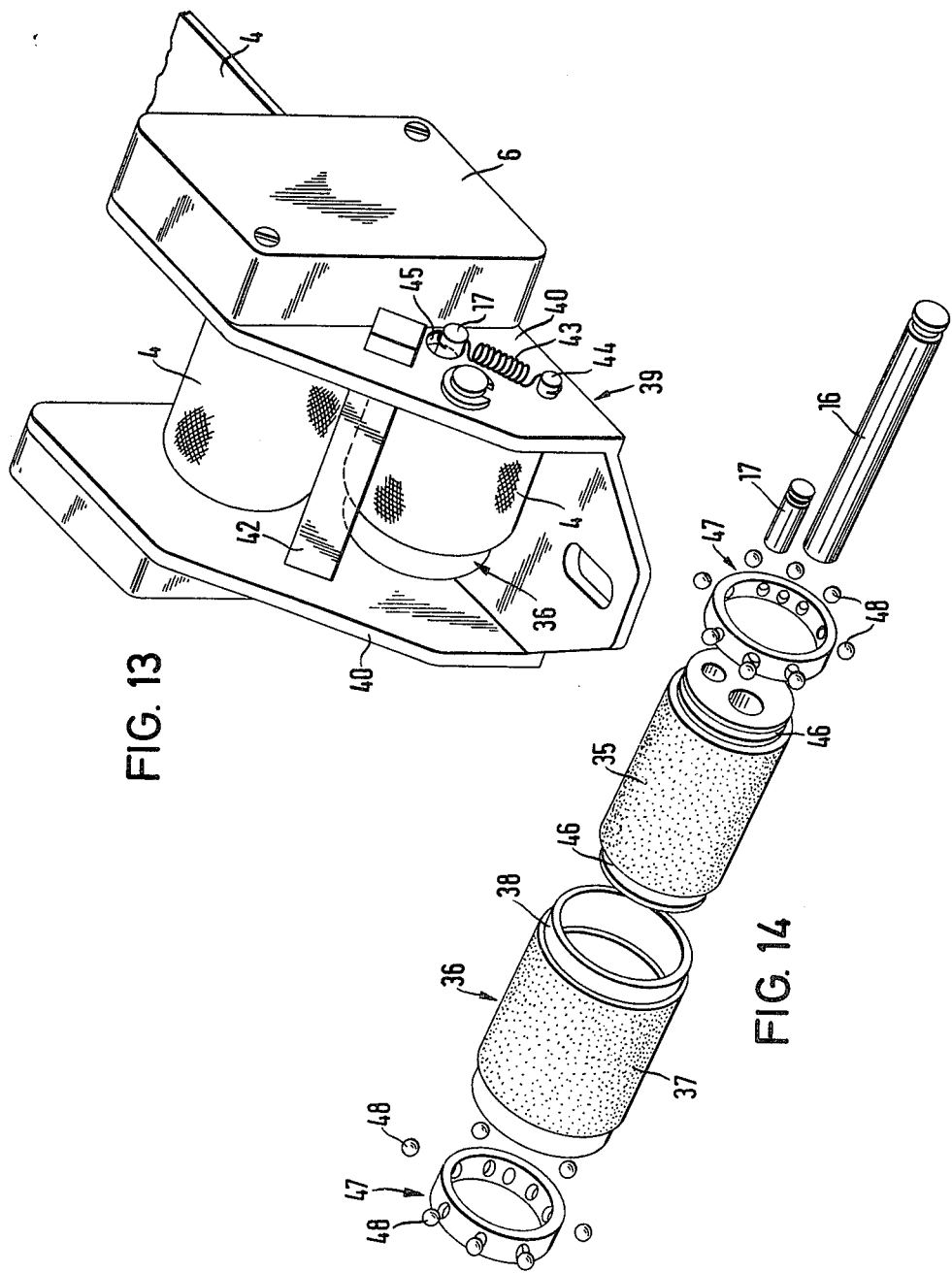

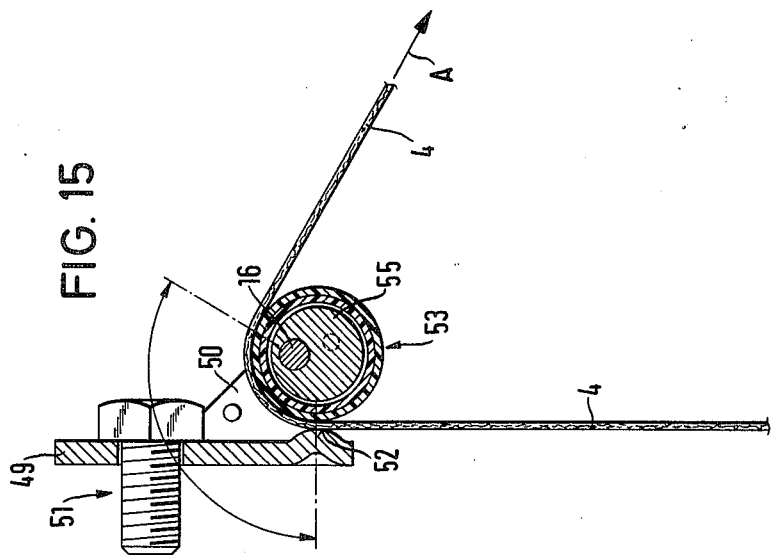
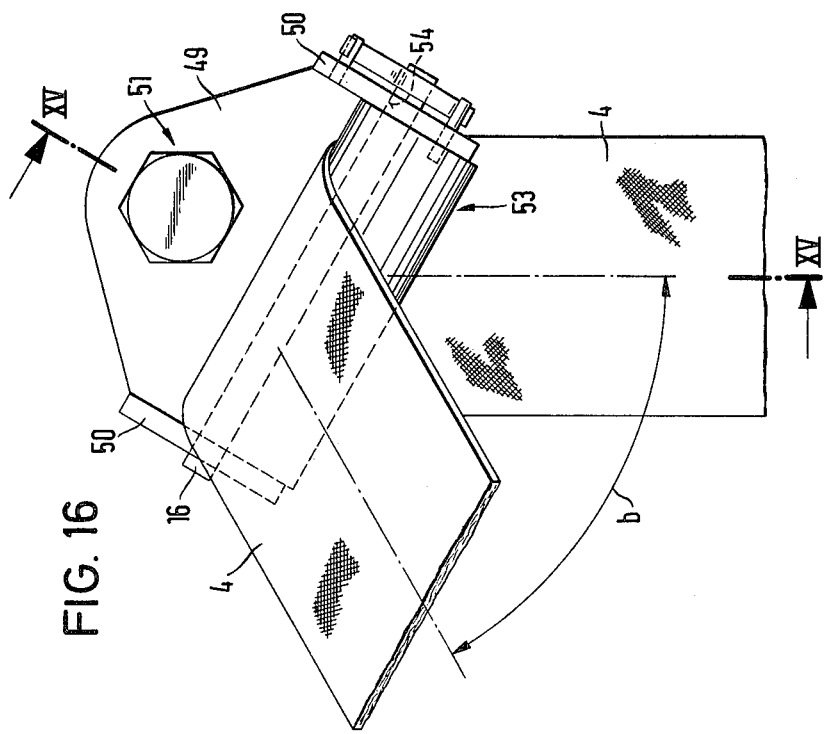

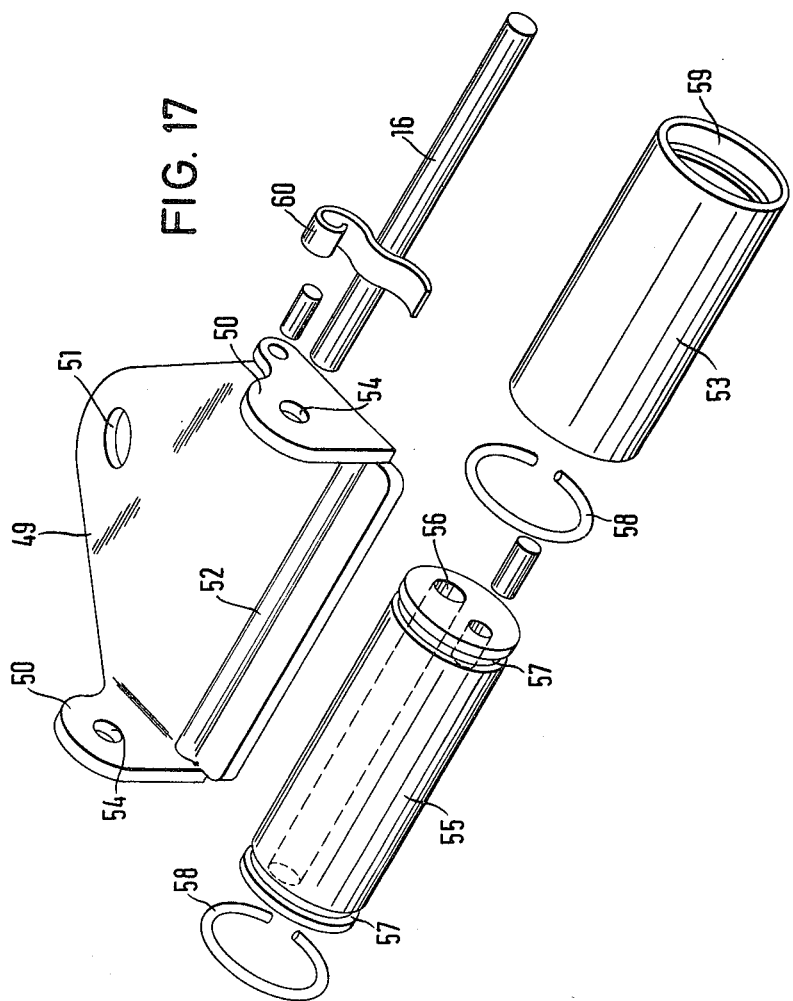

BELT STRAP-CLAMPING DEVICE FOR SAFETY BELTS IN MOTOR VEHICLES

This is a continuation of application Ser. No. 389,903 filed June 18, 1982, now abandoned.

BACKGROUND OF THE INVENTION

1. Field of the Invention

The invention relates to a belt strap-clamping device for safety belts in motor vehicles which has a roll-up device with a belt strap which is rolled up on a belt drum, and which can be rolled out against a spring force. The belt from the roll-up device is partially wrapped around a deflection member with an arched surface, hinged around an axis, and arranged after the belt drum. The belt strap works in conjunction with a clamping surface which is fixed in a fitting, such that the deflection member is moved, when an increased force above the normal pulling out of the belt is applied to the belt, with clamping of the belt strap between the clamping surface and the deflection member. At normal pulling out of the belt, the deflection member is held at a distance from the clamping surface by the force of a spring.

2. Description of the Prior Art

A known deflection fitting with a clamping device for safety belts (German Published Non-Prosecuted Application, DE-OS No. 25 40 302) has a deflection element in the form of a two-armed lever hingeably supported in a U-shaped fitting-plate. The deflection element is provided at one lever arm with a round deflection pin with a round deflection surface, while the other lever arm forms a part of the clamping device. The belt strap loops partially around the upper deflection pin and runs between a clamping surface of the lower lever arm and a clamping surface which is fastened at the fitting plate. The deflection element is held in the "free" position with respect to the clamping device by a spring at one of the lever arms. At a sudden increase of the pulling force (tension) at the belt strap, i.e. in the case of a crash, the two-armed lever is moved by the turning moment acting on the lever-like deflection element, whereby the belt strap is clamped and arrested between the clamping surface of the deflection element and the fitting plate. As the tension force is reduced, the deflection element is automatically moved back into the "free" released position by the force of the above-mentioned spring. The described concept is construction-wise costly, and requires an exceptionally stable configuration of the deflection element, and its supports, because when loads are applied, very strong lever forces are acting on the deflection element and the bearings due to the relative long lever arms.

Also, a roll-up device for a safety belt is known (German Published Prosecuted Application, DE-AS No. 14 81 969) in which a belt drum for storing the belt and a clamping device are provided within a housing for the clamping and releasing of the belt at any length of pulled-out belt. A clamping jaw with a circle-segment-shaped profile is hingeably supported in the middle of the housing, and is arranged after the belt drum. The belt strap loops around the circle-segment-shaped profile of the clamping jaw. An additional stationary clamping jaw is provided in the height of the wrap-around surface at the housing. A spring-loaded arresting device is in functional connection with the hingeably supported clamping jaw, by which, after belt withdrawal and quick belt rewinding, for example during a crash, a clamping between the two clamping jaws is effected. The arresting device locks the hingeable clamping jaws, and a further withdrawal of the belt is made impossible. The arresting device forms a stop which holds the hingeable jaw in the release position. The above-mentioned stop can be adjusted manually for different operating positions, for example, a released position for putting on the safety belt. This construction is very costly to manufacture and difficult to use.

SUMMARY OF THE INVENTION

An object of the invention is to provide a belt strap clamping device which is simple contruction-wise and cheap, but capable of absorbing loads, and providing great operating convenience, especially with respect to its free-running feature when the belt is pulled out or rewound during normal operation.

With the foregoing and other objects in view. there is provided in accordance with the invention a belt strap clamping device for safety belts in motor vehicles, which comprises a roll-up device having a belt drum on which a belt strap is rolled-up and can be rolled out against a spring force, a belt strap clamp having a deflection member supported in a fitting, with an arched deflection surface partly wrapped around by said belt strap from said roll-up device, a clamping member with a clamping surface fixed in the fitting, spring means to exert sufficient force on the deflection member to maintain the belt strap wrapped on the deflection member a short distance from the clamping surface during normal pulling out of the belt but of insufficient force to prevent movement of the deflection member and clamping the belt strap between the deflection member surface and the clamping surface when an increased force above that for normal pulling out of the belt is applied to the belt, the combination therewith wherein said deflection surface is formed by a sleeve-like deflection member which is, during normal operation, freely rotatable on a roller eccentrically supported in said fitting, said eccentrically supported roller movable, when said increased force above that for normal pulling out of the belt is applied to the belt, in a predetermined angular path in relation to said clamping surface, said belt exerting a radial force against the deflection member with the amount of friction between the surface of the deflection member and the belt strap partly wrapped around it increasing with said increasing radial force, said deflection member thereby radially displaced with respect to the roller which has moved through said angular path, and makes a positive, frictionally coupled connection with said roller.

Other features which are considered as characteristic for the invention are set forth in the appended claims.

Although the invention is illustrated and described herein as embodied in a belt strap-clamping device for safety belts in motor vehicles, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIGS. 1-3 diagrammatically illustrate a first embodiment form of the belt strap clamping device according to the invention in two sectional views in different operating position, and in one plane view. FIG. 1 shows a conventional automatic roll-up device with the belt strap extending therefrom partially wrapped around a deflector sleeve freely rotatable, during normal pull out of the belt strap, around an eccentrically mounted roller. When the force on the belt strap exceeds that of normal pull out, the roller moves toward the clamping surface of a clamping bar, with the roller getting into locking engagement with the deflector and pushing against the deflector thereby clamping the belt strap interposed between the surface of the deflector and the clamping surface as shown in FIG. 2.

FIGS. 5-7 illustrate a second embodiment form of the belt strap-clamping device according to the invention in two sectional views in different operating position and in an exploded representation. A band-like brake is interposed between the roller and the deflection member.

FIGS. 8-10 show a third embodiment form of the belt strap-clamping device according to the invention in two sectional views in different operating positions of the working parts, and in a side view. The deflection member is made of an elastically yielding material. Upon a strong force acting on the belt strap, the deflector member is deformed and makes a large area-contact with the roller corresponding to the wrap-around angle.

FIGS. 11-14 show a fourth embodiment form of the belt strap-clamping device in which the clamping device is structurally combined with an automatic roll-up device in two sectional views, a perspective view, and an exploded view.

FIGS. 15-17 illustrate a fifth embodiment form of the belt strap-clamping device according to the invention combined with a deflection fitting in a sectional view, a side view, and in an exploded representation.

DETAILED DESCRIPTION OF THE INVENTION

Figure 4:
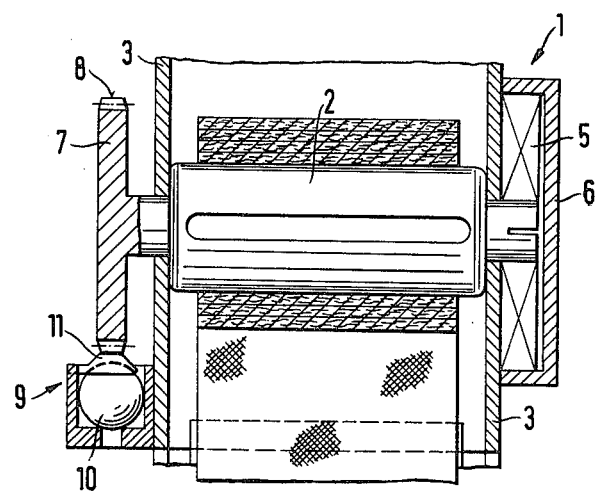
FIG. 4 shows a sectional view of the automatic roll-up device which is only schematically shown in FIGS. 1-3.

The deflection surface is formed by a sleeve-like deflection member which is during normal operation freely rotatable on an eccentrically supported roller which can be displaced in relation to a clamping surface. The surface of the deflection member is made so that at an increasing radial force the amount of friction between the belt and this surface also increases. Thereby, the deflection member is radially displaced with respect to the roller, which has moved into the blocked position, and makes a positive, frictionally coupled connection with the roller. This simple, easily manufactured roller arrangement is used as the movable clamping member, which not only acts as the deflection surface for the belt strap, but in addition, directly effects reliable clamping of the belt strap at the occurrence of an increased tension force due to its special eccentric bearing support. A special advantage is that at normal operation of the belt, i.e. at normal winding and unwinding of the belt, there are no significant friction losses making the operation of the belt more difficult, because the actual deflection member which forms the deflection element is freely rotatably supported on the fixed roller. This free rotatability is only interrupted when an increased pulling force is applied, and the deflection member is locked with the roller within a very short time. Thereby, little play between the inner surface of the deflection member and the outer surface of the roller may be provided, with the result that blocking of the deflection member is effected almost instantly and occurs even with a relatively small increase of the tension force. In this way, the operating reliability of the whole system is considerably improved. The system, when activated, immediately after the blocking of the belt-drum by, for instance, a sensor-arrangement and a pawl-locking device, results in the clamping device locking the out-rolling belt strap, and thereby also the so-called "film-spool" effect, i.e. preventing a further even limited unwinding of the belt from the belt drum. According to the invention, the coupling between the deflection member and the eccentrically supported roller can be effected by a positive connection by means of gear teeth. It can also be achieved by providing that a relatively large-area frictional connection is created between the deflection member and the roller in the event the system is activated, a condition that can be realized by a deformable construction of its bearing supports so they can yield. If the deflection member is made rigid, it is advantageous, in order to obtain a large friction surface between the deflection member and the roller, to provide an elastically deformable coupling element between the inner surface of the sleeve-like deflection member and the outer surface of the roller. This coupling element adapts itself with a relatively large area contact to the roller at the roller surface as the deflection member is displaced.

An embodiment of the belt strap-clamping device which is easy to assemble is characterized by the sleeve-like deflection member having, at least at the opposite sleeve-ends, a reduced cross-section which can be easily expanded by pressure and preferably can be pressed onto support rings.

Additional advantageous details of the invention are shown in the typical embodiments represented in the drawings and explained in the following.

In the typical embodiments according to FIGS. 1-10, a conventionally constructed automatic roll-up device 1 is shown in detail in FIG. 4. According to FIG. 4, this automatic roll-up device consists of a belt drum 2 which is rotatably supported between two U-shaped side walls of the housing 3 of the automatic roll-up device, and a flexible belt strap 4 is rolled-up on said belt drum 2. The belt drum 2 is connected at one side with a rewind spring 5, which is covered by an outer cover 6, and at the other side is provided with a locking wheel 7 with outer teeth 8 which is in a functional connection with a known sensor arrangement 9 having a displaceable inertial mass-ball 10 which can move away from its centered rest position. At the occurrence of an acceleration which exceeds a predetermined measure at the vehicle equipped with the safety belt device, the mass ball 10 is displaced and moves a locking pawl 11 in the direction toward the locking teeth 8 of the locking wheel, and locks the belt drum 2, and thereby the belt strap 4. However, after arresting the belt drum 2, there still exists a problem due to the known, so-called "film-spool effect", in which a certain length of the belt is pulled from the belt-roll by the pulling force which the forward moving mass of the person to be secured exerts on the belt 4. For this reason, a belt-strap clamping device (described later) is arranged after the automatic roll-up device 1, which automatically responds immediately after the belt drum is blocked, to clamp the moving belt strap 4 and prevent further unwinding of the belt.

In the typical embodiment according to FIGS. 1-3, this belt strap-clamping device is supported in a U-shaped fitting 12 which can be separately fastened, for example below the automatic roll-up device 1, at the fastening location 13 to the frame of the vehicle. A rigid roller 14 is rotatably supported between the two bent sides of the fitting 12. The roller 14 has an eccentric bearing opening 15, and is supported by the latter on an axis 16. A pin 17 is fastened at at least one endface of the roller 14. Pin 17 is guided in a slot-like opening 18 in the sidewalls of fitting 12. Thereby, the roller 14 can only move in a relatively small angular path. Freely rotatably supported on said essentially cylindrical roller 14 is a sleeve-like deflection member 19 consisting of a form-stable but elastically deformable inner sleeve 20, for example made of a rubber-elastic material, and an outer running sleeve 21 in fixed connection with the latter. As shown in FIGS. 1 and 2, the roller 14 has outer teeth 22 at part of its circumference, while the deflection member 19 has locking teeth 23 at its inner circumference with the same pitch. As especially further clarified by FIGS. 12, 14 and 17, the deflection member 19 is supported by bearings on both sides to be freely rotatable. The diameters of roller 14 and deflection member 19, more specifically inner sleeve 20, are dimensioned such that during normal operation, except for the ball bearings, there is a little radial play left between the deflection member 19 and the roller 14. Thus, during normal operation the deflection member can freely rotate. The bearings of the deflection member 19 can be constructed so that they elastically yield, or can be deformed, at the occurrence of a certain radial pressure. Somewhat differently, as also shown in the embodiments according to FIGS. 12, 14 and 17, the whole deflection member can be made of an elastically yielding or deformable material, which can yield with respect to the fixed ball bearings at the occurrence of a certain radial pressure. A clamping bar 24 is fixedly supported between the two side lege of U-shaped fitting 12 immediately alongside the deflection member 19. The clamping bar 24 has a clamping surface 25 with a high friction coefficient. A spring 26, which is attached to the clamping bar 24, partially loops around the axis 16, and is braced against the pin 17. The roller 14 and the deflection member 19 are held in the normal position by spring 26, as shown in FIG. 1, in which a small distance is maintained between the outer circumference of the sleeve 19, or more particularly the surface of the belt strap 4, which is wrapped half around the outer running sleeve 21, and between the clamping surface 25 of the clamping bar 24. In this normal position, the belt strap 4 can be rolled in- or out freely, without any obstruction. When the belt shaft of the automatic roll-up device is blocked by the rapid forward moving body of the person who is to be secured, an increased force in the direction A shown by the arrow acts on the belt strap 4. This pulling force A overcomes the preloading of spring 26, and moves the roller 14 with the deflection member 19 into the position shown in FIG. 2. As a result of this increased pulling force, a radial pressure is applied onto the sleeve 21 of the deflection member 19, whereby, due to the yielding support bearing of the deflection member, or due to its elastically yielding material, the above-mentioned radial play between deflection member 19 and roller 14 is overcome, and the locking teeth 23 engage positively with the outer teeth 22 of the roller 14, as shown in FIG. 2. Simultaneously, with the deflection member 19 locked by the sleeve 21, which is in a non-skid fit pushed onto the inner sleeve 20, corresponding to the formula $e^{\mu\alpha}$, the belt strap 4 applies a very high circumferential force at the deflection member 19, which has the effect of causing the belt 4 to be clamped with great force between the sleeve 21 and the clamping jaws 24. Since the sleeve 21 contains an elastic material, the belt is not damaged by this action even if extremely high braking forces are transmitted. Preferably, the surface of the sleeve 21 has such properties that during normal operation there is very little friction between the belt strap 4 and the sleeve 21, but that, as the radial force increases, the friction between belt 4 and the above-mentioned surface also increases rapidly, practically leading to a positive lock.

Figure 7:
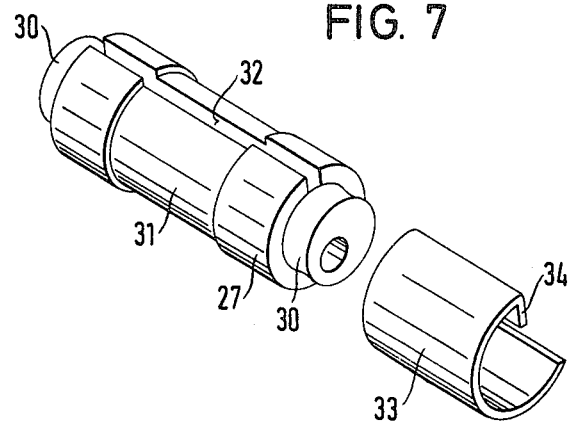

The embodiment according to FIGS. 5-7 is similar to the embodiment according to FIGS. 1-3. Here also a U-shaped fitting 12 is provided with a clamping bar 24 with a clamping surface 25. In contrast to the embodiment according to FIGS. 1-3, the surfaces of the eccentric supported roller 27 and the inner sleeve 28 of the deflection member 29- again made in two parts and elastically yielding - are made essentially smooth. Here also the inner diameter of the deflection member 29 is slightly greater than the outer diameter of the roller 27, so that during normal operation, according to FIG. 5, some radial play remains between the deflection member 29 and the roller 27, so that the free-wheeling of the deflection member 29 is assured. The roller 27, which is shown individually in detail in FIG. 7, has two bearing hubs 30, and has, in the middle, an axial reduction 31. Furthermore, the roller 27 is provided with a radial groove 32, into which a band-like brake 33 is attached in the form of an elastically deformable band spring with a bent end 34. The band-brake is disposed and retained sidewise in the reduced portion 31 of the roller 27. The surfaces of the band-brake 33, the roller 27 and the deflection member 29 are made so that a smaller amount of friction exists between the inner surface of the band-brake and the roller surface, and a greater friction exists between the outer surface of the band brake 33 and the inner surface of the deflection member 29. The band brake 33 acts in the clamping arrangement as a coupling element between the deflection member 29 and the roller 27. FIG. 5 shows the normal operating position of the system, in which the deflection member 29 lies concentrially to the roller 27 with some radial play. At the occurrence of an increased pulling force in the direction A, for example, in the case of a crash, the unit consisting of roller/deflection member is moved toward the clamping bar 24 as in the previous embodiment of FIGS. 1 and 2. In this embodiment, the deflection member 29 is of a rigid construction, but is displaced radially with respect to the roller 27 due to its support on elastically yielding pivot bearings. Thus, in the blocking position, as shown in FIG. 6, the inner surface of the deflection member 29 approximately at the height of the clamping bar 24, presses onto the free end of the band-brake 33, and the springy band-brake 33 adapts itself to the outer contour of the roller 27 due to the different friction values. In this manner, a large area friction lock is obtained between the deflection member 29 and the roller 27. Thereby, the deflection member 29 is coupled to the roller 27, and in the described manner an instant clamping of the belt strap 4 at the clamping bar 24 is effected. In the embodiment according to FIGS. 8-10, a U-shaped fitting 12 with a clamping bar 24 is again employed. Similarly, a rigid roller 35 is eccentrically supported between the side-legs of the fitting 12. The roller 35 has a smooth surface. The deflection member 36 consisting of two parts is freely rotatably supported on the roller 35. In this embodiment deflection member 36 is made of an elastically yielding material. Here also the inner diameter of the deflection member 36 is a little greater than the outer diameter of the roller 35, to permit the deflection member 36 during normal operation to freely rotate, as shown in FIG. 8. When an increased pulling force in the direction A occurs, for example, in case of a crash, the unit roller/deflection member is moved toward the clamping bar 24 about an angular path until it contacts the clamping bar 24. Simultaneously, the deflection member 36 is deformed by the radially acting pulling force, and makes a large area-contact with the roller 35, as shown in FIG. 9. The brake assembly is locked by virtue of the large area-contact, corresponding to the wrap-around angle α. The sleeve 37 is made for example, of a rubber-like material or plastic and is supported on the inner sleeve 38 with a non-skid connection. This very simple construction can be very economically manufactured and provides excellent braking of the belt strap 4 at a high load. The friction between the roller 35 and the inner sleeve 38 depends to a considerable extent on the materials used for those components. One can obtain optimal friction between the roller 35 and the inner sleeve 38, for example, if the roller is made of a light metal (extruded profile), and the surface is suitably roughened. The inner sleeve can be made of a thermoplastic synthetic material, for instance by injection molding. In this manner, a double-band brake effect results when the device is activated, on the one hand by the frictional connection between belt strap 4 and the surface of the sleeve 37, and on the other hand, by the band-brake effect between the roller 35 and the inner sleeve 38. In this embodiment, as well as in the other embodiments used as examples, one can achieve extremely short braking times by suitably dimensioning the play between the roller and the deflection member. Good results have been achieved with a play of 0.5 mm between the diameters of the parts of the brake acting together.

In the embodiment according to FIGS. 11-14, a belt strap clamping device, as described above, is combined structurally with an automatic roll-up device, for example, of the type according to FIG. 4. The housing 39 of the automatic roll-up device again has two U-shaped side legs 40, between which the belt drum 2 of the roll-up device is rotatably supported. Here also, the belt drum 2 is connected with a rewind spring and with a sensor-locking pawl arrangement, which are located behind side-cover 6. A belt strap-clamping device of the above described type, for example, according to FIGS. 8-10 is arranged below the belt shaft 2 between the side walls 40 (side legs) of the housing 39 of the automatic roll-up device. Hereby, the braking unit, deflection member 36 and roller 35 are arranged in relation to the belt shaft 2 in such manner, that the belt strap 4 is conducted with a large wrap-around angle between the opposite circumference portions of the deflection member 36. Also in this embodiment, a braking-bar 42 is fixedly supported between the side legs 40 along side of the above described braking unit. In contrast to the preceding embodiments, the roller 35, which is eccentrically supported on an axis 16, is in the normal operating position kept at a distance from the braking bar 42 by a straight tension spring 43. The tension spring 43 at one side is attached to pin 17 of the roller 35, and at the other side is attached to a pin 44 which is fixed to the housing 40. A round opening 45 in one of the side legs 40 serves to limit the rotation of the roller 35. The pin 17 extends through the opening 45. While the construction of the brake unit in FIG. 11 is only schematically indicated, FIGS. 12 and 14 clearly show the construction of the roller 35 and the deflection member 36. The roller 35 again has an essentially even or roughened surface, and is provided at its sides with reduced support hubs 46. Annular ball bearings 47 with bearing balls 48 are pushed onto these bearing projections 46. The sleeve-shaped deflection member 36 is pushed onto the roller 35 in such a manner that the inner sleeve 38 sits with its side-ends on the ball bearings 47. As shown in FIG. 12, the inner diameter of the inner sleeve 38 is slightly greater than the outer diameter of the roller 35. The inner sleeve 38 as well as the running-sleeve 37 which is sitting on the inner sleeve 38 so that it cannot rotate, are both made of an elastically deformable material. As shown clearly in FIG. 12, the width of the sleeve 37 corresponds approximately to the width of the belt strap 4. The ball bearings 47 are arranged at a distance from each other, which distance exceeds the width of the belt 4 and of the sleeve 37. In this manner, an elastically yielding region is provided between the bearings 47 in deflection region of the belt strap 4, which can be easily elastically deformed in direction toward the roller surface when an increased pulling force in direction A acts on the belt strap 4.

FIGS. 15-17 show an embodiment wherein a belt strap clamping device of the above-described type is a part of a deflection fitting. This deflection fitting has a fitting-plate 49 with two U-shaped, bent-up side legs 50 and the fitting plate also has a fastening place 51. A convex stiffening corrugation 52 is press-formed in the material of the fitting plate 49, extending between the side legs 50. Corrugation 52 serves to function as the braking bar according to the preceding embodiments, and has a clamping surface with a great amount of friction. The construction and function of the deflection member 53 serving as the deflection element of the deflection fitting, can be directly compared with the clamping device according to FIGS. 11-14. An axis 16 is supported in the bearing openings 54 in the side legs 50, on which the roller 55 is hingeably and eccentrically supported. The roller 55 is provided with a bearing hole 56. The roller 55 has at both ends concentric undercuts 57 for retaining spring rings 58 which preferably are made of round wire. The deflection member 53 which is made of a pressure deformable material has at its two sleeve endings a reduced cross-section 59, and between the ends, a small through-bore. The deflection member 53, which for example is made in one piece of an elastically deformable material, is pushed onto the roller 55, and the spring rings 58 are assembled by expanding the reduced ends 59 between the deflection member 53 and the roller 55, so that a slide support is produced which cannot move in the axial direction. Again, the unit roller/deflection member, corresponding to the previously described embodiments, can be moved around a predetermined angle from a normal operating position in which it is kept by a spring 60 in a manner already described, into a clamping position at the occurrence of an increased tension force, whereby in the clamped position the belt strap 4 is clamped between the corrugated reinforcement 52 and the deflection member 53 which is arrested by friction lock with roller 55. The coupling between the deflection member 53 and the roller 55 is effected by the elastic deformation of the sleeve-like deflection member 53. A suitable material for the deflection member 53, which at the same time can represent the outer sleeve, will, when the pulling force increases in the direction A, cause the friction to become so great by the elastic deformation of the surface of the deflection member 53, that a positive lock is formed between the belt strap 4 and the deflection member 53, as shown in FIG. 15. This can be achieved, for example, by using PVC-material (polyvinylchloride) or a corresponding PUR-material (polyurethane), at least for the outer shell of the deflection member 53. Since, during normal operation, the belt strap 4 makes the angle b at the deflection fitting, the amount of friction between the belt 4 and the deflection member 53 must be correspondingly small during normal operation. At the occurrence of an increased pulling force, i.e. in case of a crash, the before-mentioned amount of friction is considerably increased. For this reason, the surface of the deflection member 53 is best not a rubber-material. However, a rubber-like material can be used to advantage in the other embodiments used as examples, because in the latter their wrap-around angle is considerably greater than in the embodiment according to FIGS. 15–17.

I claim:

1. A device for clamping a safety belt in a motor vehicle, said device comprising a clamp member, a roller, means for supporting said roller for movement about an axis offset from the roller axis and toward and away from said clamp member, a sleeve circumscribing said roller and rotatable relative thereto, said sleeve and clamp member defining a nip through which the belt passes, said sleeve having a curved outer surface around which the belt is wrapped, said sleeve having at least a portion movable to establish a coupled connection with said roller upon application of a predetermined force to the belt to prevent rotation of said sleeve relative to said roller and to effect movement of said roller and sleeve about said offset axis to cause said sleeve to clamp the belt against said clamp member.

2. A device as set forth in claim 1 further including bearing means for supporting said sleeve with an intermediate portion of said sleeve radially spaced from said roller, said intermediate portion of said sleeve being resiliently deflectable radially inwardly into engagement with said roller under the influence of force applied against the intermediate portion of said sleeve by the belt upon application of a predetermined force to the belt to thereby establish the coupled connection with said roller.

3. A device according to claim 2 wherein said bearing means includes a bearing at each end of said sleeve, said sleeve having reduced cross section portions at its respective opposite ends which can be elastically expanded to receive the respective bearings.

4. A device according to claim 1 further including elastically yieldable bearing means supporting said sleeve for rotation relative to said roller and which yield upon application of the predetermined force to the belt.

5. A device according to claim 1 wherein an elastically deformable coupling element is located between the inner surface of the sleeve member and the outer surface of the roller to provide said coupled connection.

6. A device according to claim 5 wherein said coupling element comprises a spring leaf-like band brake extending around a portion of the roller circumference, said band brake having a smaller friction value between it and the roller than the friction value between it and the inner surface of the sleeve member.

7. A device according to claim 1 wherein said roller has teeth on its outer peripheral surface and said sleeve member is provided with locking teeth on its inner surface and which teeth interdigitate to provide said coupled connection.

8. A device according to claim 1 wherein the deflection member comprises an inner sleeve and an outer sleeve.

9. A device according to claim 8 wherein said outer sleeve is an outer coating made of a rubber-elastic material.

10. A device according to claim 1 wherein said sleeve has an outer surface of a nonrubber-like material having a low friction value during normal operation and which increases as the force of the belt is increased.

11. A device for use in a motor vehicle, said device comprising a housing, a belt reel rotatably supported in said housing and on which a belt may be rolled-up, a spring biasing said reel in a direction to roll-up the belt, a clamp member mounted in said housing, a roller, means for supporting said roller in said housing for movement about an axis offset from the roller axis and toward and away from said clamp member, a sleeve circumscribing said roller and rotatable relative thereto, said sleeve and clamp member defining a nip through which the belt passes, said sleeve having a curved outer surface around which the belt is wrapped, said sleeve also having at least a portion movable to establish a coupled connection with said roller upon application of a predetermined force to the belt to prevent rotation of the sleeve relative to said roller and to effect movement of said roller and sleeve about said offset axis to cause said sleeve to clamp the belt against said clamp member.

12. A device according to claim 11 wherein said clamp member is arranged in the housing of the roll-up device a distance below said belt reel such that the belt has a large wrap-around angle around the circumference of the deflection member.

* * * * *